US007003706B2

(12) United States Patent
McBride et al.

(10) Patent No.: US 7,003,706 B2
(45) Date of Patent: Feb. 21, 2006

(54) METHOD, SYSTEM, AND PROGRAM FOR IMPROVED DEVICE BLOCKING AND SUSPENSION

(75) Inventors: Gregory Edward McBride, Tucson, AZ (US); Alan George McClure, Tampa, FL (US); Robert Nelson Crockett, Tucson, AZ (US); Donald Reynold Blea, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 10/445,688

(22) Filed: May 27, 2003

(65) Prior Publication Data

US 2004/0243892 A1 Dec. 2, 2004

(51) Int. Cl.
*G11C 29/00* (2006.01)
(52) U.S. Cl. ............................ 714/719; 714/44; 714/47; 711/113
(58) Field of Classification Search ................ 711/135, 711/143, 112, 162, 113; 710/306, 100; 714/719, 714/44, 47
See application file for complete search history.

(56) References Cited

U.S. PATENT DOCUMENTS

| | | | |
|---|---|---|---|
| 5,504,861 A | | 4/1996 | Crockett et al. |
| 5,615,329 A | | 3/1997 | Kern et al. |
| 5,829,030 A | * | 10/1998 | Ishida et al. ................ 711/135 |
| 6,070,232 A | * | 5/2000 | Ishida et al. ................ 711/143 |
| 6,230,239 B1 | | 5/2001 | Sakaki et al. |
| 6,360,291 B1 | * | 3/2002 | Tavallaei ..................... 710/306 |
| 6,374,327 B1 | | 4/2002 | Sakaki et al. |
| 6,484,187 B1 | | 11/2002 | Kern et al. |
| 6,792,490 B1 | * | 9/2004 | Tavallaei ..................... 710/100 |
| 6,813,682 B1 | * | 11/2004 | Bress et al. ................. 711/112 |
| 6,862,671 B1 | * | 3/2005 | Bergsten ..................... 711/162 |
| 2001/0011324 A1 | | 8/2001 | Sakaki et al. |

OTHER PUBLICATIONS

IBM Corporation, *DFSMS Advanced Copy Services*. First Edition (vol. 1, Release 1), 2001. pp. 1-278.

* cited by examiner

*Primary Examiner*—David Ton
(74) *Attorney, Agent, or Firm*—Janaki K. Davda; Konrad Raynes & Victor LLP

(57) ABSTRACT

Disclosed is an article of manufacture, system, and program for determining device suspension and device blocking. Local session cache usage and residual counts are compared against limit values associated with that session, wherein the limit values comprise a device blocking count, a device blocking percent, a suspend count, and a suspend percent for the local session. If a cache in trouble condition is detected based on the comparison, the cache in trouble condition is processed to determine whether one or more volumes are to be blocked or suspended.

33 Claims, 9 Drawing Sheets

METHOD, SYSTEM, AND PROGRAM FOR IMPROVED DEVICE BLOCKING AND SUSPENSION

BACKGROUND OF THE INVENTION

1. Field of the Invention

The present invention is related to improved device blocking and suspension.

2. Description of the Related Art

Disaster recovery systems typically address two types of failures, a sudden catastrophic failure at a single point in time or data loss over a period of time. In the second type of gradual disaster, updates to volumes may be lost. A volume is any logical or physical element of storage. To assist in recovery of data updates, a copy of data may be provided at a remote location. Such dual or shadow copies are typically made as the application system is writing new data to a primary storage device. A storage device is a physical unit that provides a mechanism to store data on a given medium, such that the data can be subsequently retrieved. International Business Machines Corporation (IBM), the assignee of the subject patent application, provides a system for maintaining remote copies of data at a secondary storage device, which is referred to as an extended remote copy (XRC) system.

An IBM XRC system provides a technique for recovering data updates between a last, safe backup and a system failure. Such data shadowing systems can also provide an additional remote copy for non-recovery purposes, such as local access at a remote site. The IBM XRC system is described further in z/OS V1R1.0 DFSMS Advanced Copy Services (IBM Document Number SC35-0428-00), April 2001, which is available from International Business Machines Corporation.

In such backup systems, data is maintained in volume pairs. A volume pair is comprised of a volume in a primary storage device and a corresponding volume in a secondary storage device that includes a consistent copy of the data maintained in the primary volume. Typically, the primary volume of the pair will be maintained in a primary storage control, and the secondary volume of the pair is maintained in a secondary storage control at a different physical location than the primary storage control. A storage control is a physical hardware unit that consists of a storage server integrated with one or more storage devices to provide storage capability to a host computer. A storage server is a physical unit that provides an interface between one or more storage devices and a host computer by providing the function of one or more logical subsystems. The storage server may provide functions that are not provided by the storage device. The storage server is composed of one or more clusters of storage devices. A primary storage control may be provided to control access to the primary DASD and a secondary storage control may be provided to control access to the secondary DASD.

In the IBM XRC environment, the application system writing data to the primary volumes includes a sysplex timer which provides a time-of-day (TOD) value as a time stamp to data writes. The application system time stamps data when writing such data to volumes in the primary DASD. The integrity of data updates is related to insuring that updates are done at the secondary volumes in the volume pair in the same order as they were done on the primary volume. In the XRC and other prior art systems, the time stamp provided by the application program determines the logical sequence of data updates. In many application programs, such as database systems, certain writes cannot occur unless a previous write occurred; otherwise the data integrity would be jeopardized. Such a data write whose integrity is dependent on the occurrence of previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of related data that need to be kept in a consistent state. A consistency transaction set is a collection of updates to the primary volumes such that dependent writes are secured in a consistent manner. For instance, in the banking example, in order to maintain consistency, the withdrawal transaction needs to be in the same consistent transactions set as the deposit or in a later consistent transactions set; the withdrawal cannot be in an earlier consistent transactions set. Consistency groups maintain data consistency across all volumes managed by the IBM XRC system. That is, data consistency is maintained across all volumes. Also, the deposit information may be on one volume, and the withdrawal information may be on another volume. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data. A consistency group has a consistency time for all data writes in a consistency group having a time stamp equal or earlier than the consistency time stamp. In the IBM XRC environment, the consistency time is the latest time to which the system guarantees that updates to the secondary volumes are consistent. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

Consistency groups are formed within a "session." A session (comprises all the activities which take place during the establishment, maintenance, and release of a connection for a function, such as copying data from a primary storage device to a secondary storage device. All volume pairs assigned to a session will have their updates maintained in the same consistency group. Thus, the sessions determine the volumes whose updates will form a consistency group.

Consistency groups are copied to journal data sets to ensure that updates are not lost before they can be applied to secondary storage devices. From the journal data sets, updates from a consistency group are applied to the secondary volume. If the system fails while updates from the journal are being applied to a secondary volume, during recovery operations, the updates that did not complete writing to the secondary volume can be recovered from the journal and applied to the secondary volume.

Customers who make backup copies of their production data (also referred to as "shadow data") using an IBM XRC system may experience premature or unneeded blocking of data writes to storage devices (e.g., primary DASD) storing production data. Blocking of data writes is also referred to as "device blocking" because writes to a storage device (e.g., a volume) are blocked.

An example of a storage control is IBM TotalStorage Enterprise Storage Server (ESS), which is available from International Business Machines Corporation. One storage control may be considered to be the primary control unit, while another storage control may be considered to be the secondary control unit. Each control unit includes cache. When an application updates data on a primary volume managed by the IBM XRC system, the primary control unit copies the updates to a record set in cache. The number of updates in a record set are referred to as "residual records" or "residuals". The IBM XRC system then reads these record sets from the control unit cache into the IBM XRC system data buffers, and creates consistency groups (as described earlier). The residuals remain in the cache of the primary control unit until the consistency group formed by the residuals is copied to a journal data set.

Storage controls, such as the ESS, which support device blocking, provide the function of temporarily blocking write Input/Output (I/O) requests for production data. In addition, these storage controls may also provide the ability to enable a "long busy" situation on the storage control. A "long busy" situation is one in which the primary control unit notifies a host that it will not accept any more write I/O requests from the host. Where device blocking temporarily blocks write I/O for a storage device (i.e., temporarily blocks every other write I/O request for the storage device), the long busy situation stops all write I/O for all devices that are associated with the storage control whose cache usage has exceeded a certain percentage. The stoppage continues until cache usage is reduced to below the exceeded percentage. A copy services session (e.g., an IBM XRC session) comprises all the activities which take place during the establishment, maintenance, and release of a connection for copying data from a primary control unit to a secondary control unit.

When a production device (e.g., a primary storage device and a primary volume) is added to an IBM XRC session, the IBM XRC session sends an indicator to the storage control indicating that write I/O for the storage device should be blocked after a specified number of write records (also referred to as a residual count) for the storage device have been placed in the primary control unit cache. In particular, a residual count is maintained for each storage device and indicates a number of update records in cache for that storage device. The primary control unit places the write I/O records in cache to allow the IBM XRC session the ability to read them in order that they may be copied to another location (e.g., the secondary control unit, which is also referred to as a shadowed device).

The default value (i.e., blocking threshold) at which device blocking is started for an IBM XRC session is 1280 (500 hex). That is, if over 1280 write records (residual count) are accumulated in cache for a given primary storage device before the IBM XRC session is able to read the write records for this primary storage device, the primary control unit will block every other write I/O request for this primary storage device until the IBM XRC session is able to get the residual count for this primary storage device below this number (i.e., 1280) by reading the write updates from the cache.

The IBM XRC session performs storage device blocking based on the residual count of the storage device regardless of the size of cache available in the primary control unit associated with the storage device. New models of primary control units allow for large cache sizes such as 3 gigabits (3 GB). If an application writes 1280 records with the maximum record length of 56,664 for a given primary storage device, the amount of cache that could be consumed is approximately 72 megabits (72 MB), which is a very small portion of cache (i.e., approximately 0.2 percent of a 3 GB cache). If no other write I/Os were taking place to this primary control unit, this particular primary storage device would be device blocked unnecessarily because cache would still remain available for additional residuals. In addition, periodically (e.g., every 10 seconds), the IBM XRC session determines whether the residual count for the primary storage device that is being device blocked has been reduced below the current blocking threshold, and if not, the IBM XRC reduces the blocking threshold by half.

The purpose of device blocking is to ensure that the primary control unit cache is not over-run with data that needs to be read by copy services functions (e.g., those of the IBM XRC session). Device blocking, however, does not take into account the amount of total cache at the primary control unit used by copy services. Thus, there is a need in the art for improved use of cache.

SUMMARY OF THE INVENTION

Provided are an article of manufacture, system, and method for determining device suspension and device blocking. Local session cache usage and residual counts are compared against limit values associated with that session. The limit values comprise a device blocking count, a device blocking percent, a suspend count, and a suspend percent for the local session. If a cache in trouble condition is detected based on the comparison, the cache in trouble condition is processed to determine whether one or more volumes are to be blocked or suspended.

Additionally, an article of manufacture is provided for determining device suspension and device blocking. At least one of local session cache usage and residual counts are compared against limit values associated with that session. The limit values comprise at least two of a device blocking count, a device blocking percent, a suspend count, and a suspend percent for the local session. If a cache in trouble condition is detected based on the comparison, the cache in trouble condition is processed to determine whether one or more volumes are to be blocked or suspended.

Furthermore, an article of manufacture is provided for determining at least one of device suspension and device blocking. At least one of a local session cache usage and residual counts are compared against limit values associated with that session. The limit values comprise at least one of a device blocking percent, a suspend count, and a suspend percent for the local session. If a cache in trouble condition is detected based on the comparison, the cache in trouble condition is processed to determine whether one or more volumes are to be blocked or suspended.

The described implementations of the invention provide a method, system, and program for improved device blocking and device suspension. In particular, more information is gathered for a system data mover so as to autonomically adjust device blocking and device suspension of all volumes on storage devices across all control units (e.g., primary control units). Along with this additional information, additional values are used to determine the different actions to be taken, which include device blocking, device suspension, or both device blocking and device suspension.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
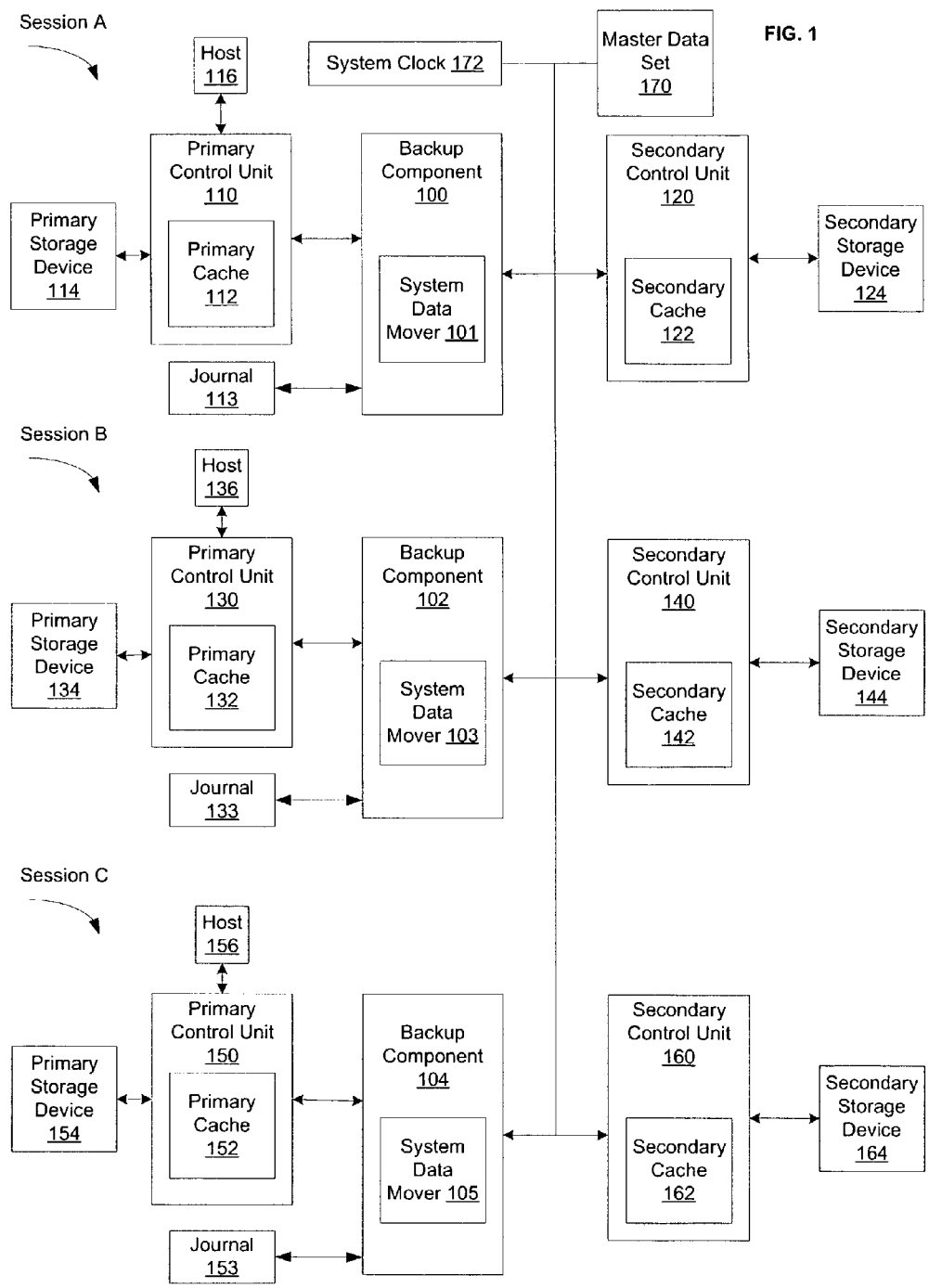
FIG. 1 illustrates, in a block diagram, a computing environment in accordance with certain implementations of the invention.

FIG. 1 illustrates, in a block diagram, a computing environment in accordance with some implementations of the invention. Primary control units 110, 130, and 150 provide one or more host computers 116, 136, or 156, respectively, access to primary storage devices 114, 134, and 154, respectively. The primary storage devices may be, for example, primary DASD. One or more applications may be executing on each host computer 116, 136, or 156 to update data on the primary storage devices. The primary control units 110, 130, and 150 also have primary caches 112, 132, and 152, respectively, in which updates to tracks in the primary storage devices 114, 134, and 154, respectively, are maintained until destaged to the primary storage devices 114, 134, and 154. Back-up copies of all or a subset of the volumes of the primary storage devices 114, 134, and 154 may be maintained at secondary storage devices 124, 144, and 164, respectively.

A primary site may include primary control units 110, 130, and 150, primary storage device 114, 134, and 154, and host computers 116, 136, and 156. A secondary site may include secondary control units 120, 140, and 160, and secondary storage devices 124, 144, and 164. The secondary control units 120, 140, and 160 also have secondary caches 122, 142, and 162. Operator computers (not shown) may be attached to the secondary control units 120, 140, and 160. The secondary storage devices may be, for example, secondary DASD.

In some implementations, a "volume pair" comprises a volume in the primary storage device and the shadow of that volume in the secondary storage device that maintains a back-up copy of the data at the primary volume in the volume pair. In certain implementations, for each primary volume, there is a corresponding secondary volume with consistent contents; this is a volume pair. For example, updates to the primary storage device 114 are transferred to the secondary control unit 120 for storage in the secondary storage device 124.

The primary control units 110, 130, and 150 may further include a non-volatile storage unit (not shown), such as a battery-backed up volatile memory, to maintain a non-volatile copy of data updates. In certain implementations of the invention, the primary control units 110, 130, and 150 and secondary control units 120, 140, and 160 may be comprised of the IBM Total Storage Enterprise Storage Server (ESS), which is available from International Business Machines Corporation.

Backup components 100, 102, and 104 transfer updates made to primary storage devices 114, 134, and 154 to secondary control units 120, 140, and 160. Each backup component 100, 102, and 104 includes a system data mover 101, 103, and 105, respectively, for transferring backup data from the primary control units 110, 130, and 150 to the secondary control units 120, 140, and 160, respectively. In certain implementations of the invention, the system data mover 101, 103, and 105 is the system data mover computer program included in an IBM XRC system. Although examples herein may refer to IBM XRC systems, techniques of the invention are not limited to IBM XRC systems and may be used with various architectures and systems. Additionally, although the system data movers 101, 103, and 105 are illustrated as separate from primary control units 110, 130, and 150, respectively, the system data movers 101, 103, and 105 may instead be part of the primary control units 110, 130, and 150 or secondary control units 120, 140, and 160. The system data movers 101, 103, and 105 are in communication with the primary control units 110, 130, and 150 and secondary 120, 140, and 160 control units, and manages the transfer of updates to the secondary storage device 124, 144, and 164. Thus, data is transferred between the primary 110, 130, and 150 and secondary 120, 140, and 160 control units via the backup components 100, 102, and 104.

In certain implementations, the backup components 100, 102, and 104, the primary control units 110, 130, 150, and secondary control units 120, 140, and 160 communicate via communication paths, such as direct high speed transmission lines (e.g., an Enterprise System Connection (ESCON®) link). However, the communication paths may be comprised of any other communication means known in the art, including network transmission lines, fiber optic cables, etc.

Each backup component 100, 102, and 104 may transfer backup data from any primary control unit 110, 130, and 150. Each volume from each primary storage device corresponds to a volume on a secondary storage device. For example, a first volume on primary storage device 114 is backed up to a volume on secondary storage device 124, and a second volume on primary storage device 134 is backed up to a volume on secondary storage device 144. In certain implementations, one or more volumes are not backed up.

In certain implementations of the invention, backup components 100, 102, and 104 receive an indication from the primary control units 110, 130, and 150, respectively, that identifies updates that should be sent to secondary control units 120, 140, and 160, respectively, for application to secondary storage devices 124, 144, and 164, which store secondary data (i.e., data that is constantly updated). Alternatively, backup components 100, 102, and 104 may intercept updates to primary storage devices 114, 134, and 154, respectively, for transfer to secondary control units 120, 140, and 160, respectively, Primary storage devices 114, 134, and 154 and secondary storage devices 124, 144, and 164, contain volumes. In certain implementations, one backup component 100, 102, or 104 processes backup data for one volume. For example, primary storage device 114 may include Volume1 and Volume2. Backup component 102 may process all backup data with update information for Volume1, while backup component 104 may process all backup data with update information for Volume2. Volume1 and Volume2 on primary storage device 114 correspond to volumes on secondary storage device 124.

The primary control units 110, 130, and 150 initially write data updates to a sidefile in primary caches 112, 132, and 152, respectively. The system data movers 101, 103, and 105 retrieve data updates from the sidefiles and write them to journals 113, 133, and 153, respectively. Within the journals 113, 133, and 153, updates are arranged into consistency groups. Consistency groups are formed for all updates to volumes that share a session. The consistency group contains records that have their order of update preserved, even across multiple storage controls. This preservation of order is useful for applications that process dependent write input/output operations.

Each primary/secondary control unit pair manages a fixed number of volumes. Thus, for mass storage applications that require a greater number of volumes, multiple sessions may be used concurrently. Moreover, volumes from multiple primary/secondary control unit pairs may be included within a single session. Additionally, data sets may span sessions within a single primary/secondary control unit pair or across multiple primary/secondary control unit pairs.

The computing environment illustrated in FIG. 1 includes sessions A, B, and C. The volume pairs in the primary and secondary storage devices 114 and 124 form the volumes of "Session A," the volume pairs in primary and secondary storage devices 134 and 144 form the volumes in "Session B," and the volume pairs in primary and secondary storage devices 154 and 164 form the volumes in "Session C." However, volumes in the multiple primary/secondary pairs can be arranged in any number of different sessions.

A master data set 170 maintains a list of the sessions being managed, and for each managed session, various information. The master data set 170 may be implemented in various forms of shared memory, such as a common cache, table, physical device, logical device, etc. The master data set 170 lists for each session various statistics about activity in that session, including, for example: 1) most-recent update time, defined as the time of the last update occurring to any volume in the session; 2) journal time, defined as a timestamp of a record stored in the journal, and signifies the latest time at which that data can be recovered; 3) consistency form time, defined as the earliest of all control units' most-recent update times; 4) secondary data consistency time, defined as timestamp of the data that was last written to the secondary data storage by any controller; 5) identification of any errors occurring on the session; 6) the state of this session's processing of any universal commands; and, 7) the state of this session's processing of this or any other session's errors.

Thus, the mass storage space formed by the volumes in the primary and secondary control units define three sessions A, B, and C. Data sets may span different sessions and span the volumes between primary/secondary control unit pairs. The master data set 170 includes a storage region for each session indicating among other things, the time the most recent update to a volume in that session was entered into the journal. For each session, the corresponding system data mover 101, 103, and 105 communicates any journaled changes to the master data set 170.

A common system clock 172 provides the time stamps for updates to ensure that a common time is used across all primary/secondary pairs. Thus, the system clock 172 provides a common time reference for application programs writing updates to volumes to ensure that updates are not shadowed out of sequence.

For ease of understanding, the term "device blocking" will be used herein to indicate the conventional technique, and the term "volume pacing" will be used herein to refer to techniques provided by certain implementations of the invention. Volume pacing includes the ability to perform device blocking on a storage device using residual count limits and total primary control unit cache usage limits, as well as the ability to suspend backup component activity on a storage device, group of storage devices, or an entire backup component session (i.e., a copy services session, such as an IBM XRC session) based on residual count limits and total storage control cache usage limits.

Device blocking has a single blocking threshold value by which device blocking is determined. On the other hand, volume pacing has four thresholds, which will be referred to herein as limit values. The four limit values may be set or modified by users (e.g., system administrators). In certain implementations of the invention, volume pacing takes effect when any one of these limit values is exceeded. In certain alternative implementations of the invention, volume pacing may take effect when some combination of the limit values is exceeded. The four limit values are: 1) device blocking count is the residual count limit above which the system data mover indicates to a primary control unit that write I/O for a volume is to be temporarily blocked; 2) suspend count is the residual count limit above which the system data mover suspends shadowing activity for a volume; 3) device blocking percentage is the percentage of cache usage limit above which the system data mover indicates to the primary control unit that write I/O for a volume is to be temporarily blocked; and, 4) suspend percentage is the percentage of cache usage limit above which the system data mover suspends shadowing activity for a volume, a group of volumes, or an entire local session. The term local session refers to a copy services session, and each copy services session views itself as a local session. In certain implementations of the invention, the limit values are tuning parameters that are accessed through a parameter library file.

Figure 2:
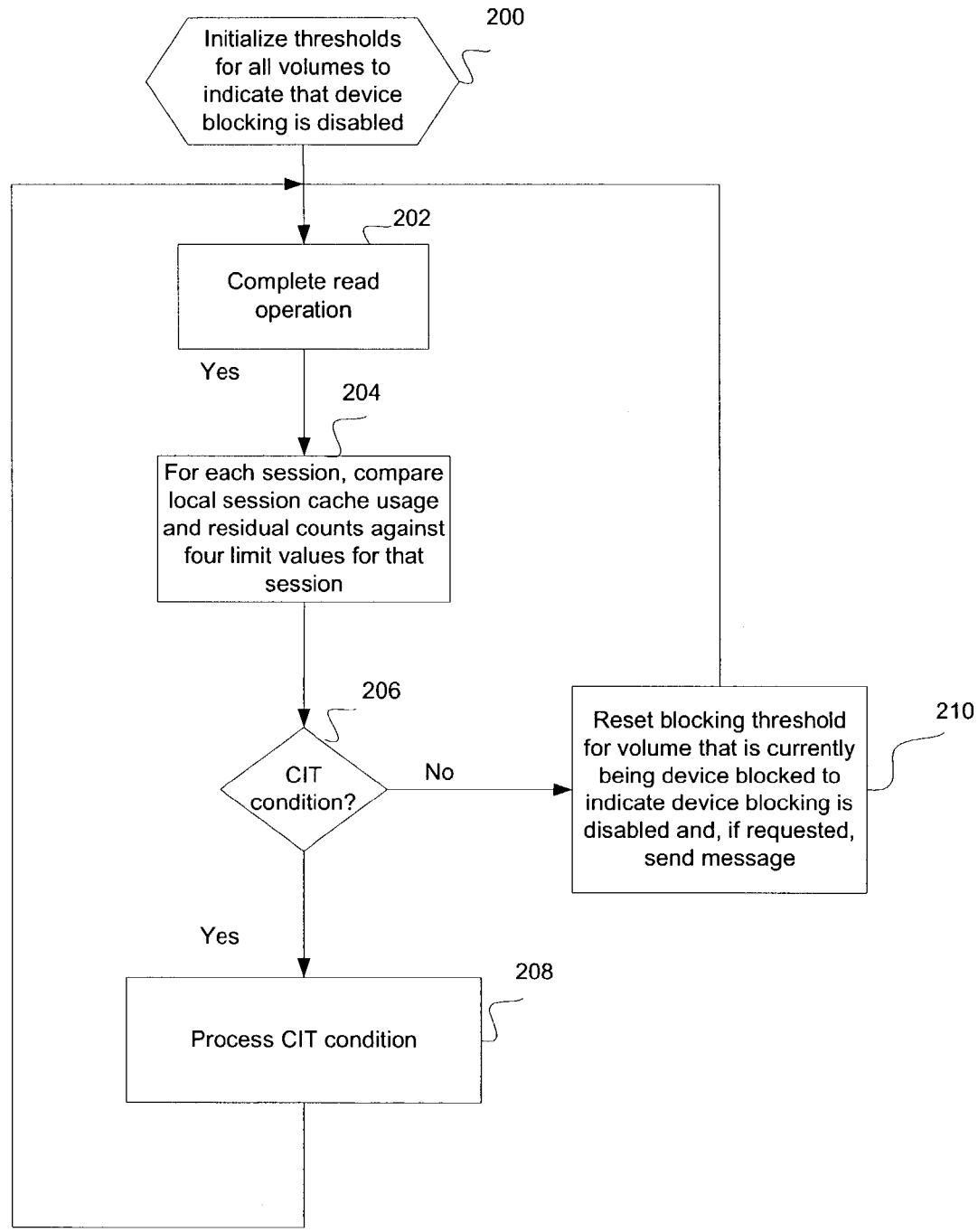
FIG. 2 illustrates logic for determining and processing a cache-in-trouble (CIT) condition at a primary control unit in accordance with certain implementations of the invention.

FIG. 2 illustrates logic for determining and processing a cache-in-trouble (CIT) condition at a primary control unit in accordance with certain implementations of the invention. Control begins in block 200 with blocking thresholds for all volumes at the primary control unit set to indicate that device blocking is disabled (e.g., set to zero). Any numeric, alphabetic, or alphanumeric value may be used (e.g., NULL) to indicate that device blocking is disabled. The system data move dynamically enables device blocking and device suspension as needed to manage cache utilization and residual counts. Although device blocking is disabled, users may assign a DONOTBLOCK attribute to one or more volumes to indicate that the volumes should not be blocked (i.e., that the system data mover should not dynamically enable device blocking for the designated volumes.

In block 202, the system data mover completes a read operation. In certain implementations of the invention, the read operation is triggered by an amount of data in the cache and reads data from the cache that is to be transferred to the secondary control unit or by a one second timer. In certain implementations of the invention, the system data mover checks for a CIT condition after each read operation (which may occur multiple times a second) and determines whether a cache-protection action is required. In certain other implementations of the invention, the system data mover may check for a CIT condition based on one or more other factors (e.g., after every 10 seconds, after every third read operation, etc.). In certain implementations of the invention, the factors that determine when the check for a CIT condition is made may be set by a user (e.g., a system administrator).

In block 204, for each session, the system data mover compares local session cache usage and residual counts for each volume of the local session against the four user-specified limit values of device blocking count, device blocking percent, suspend count, and suspend percent for that session. In certain implementations of the invention, for each local IBM XRC session, there are four limits to be used for managing volume pacing of storage devices on storage controls managed by the session (i.e., the limits are default limits if explicit limits are not set). Default values may be set via a default values file (e.g., a parameter library file). In certain implementations of the invention, values of zero for a limit value indicate that the limit is not in effect. In other implementations, a value other than zero may be used to indicate that the limit value is not in effect. In addition, an XSET command, which is an IBM XRC command, may be used to set explicit limits (i.e., for any or all of the four limits) to different values for individually selected storage controls (and, more specifically, individual subsystem identifiers (SSIDs)). In certain implementations of the invention, the device threshold limit that a user can set for an individual volume is applicable to storage devices associated with storage controls that do not provide cache statistics. In certain implementations of the invention, a nonzero initial device blocking threshold can be established by a user to provide a level of cache protection that is effective prior to crossing dynamic volume pacing limits. Once those limits are exceeded, the initial threshold on a device can be modified as needed to relieve the cache in trouble condition, then subsequently returned to its original value.

In block 206, the system data mover determines whether a CIT condition exists for any session. From block 206, if there is a CIT condition, processing continues to block 208, otherwise, processing continues to block 210. In block 208, the CIT condition is processed, and this will be described in further detail with reference to FIG. 3 below. In block 210, one or more volumes for each session for which there is device blocking will have their blocking thresholds reset to indicate that device blocking is disabled. Additionally, in block 210, if a device blocking message indicator (e.g., a DeviceBlockingMessage parameter) is set to indicate that a message is to be sent (e.g., DeviceBlockingMessage is set to YES or ALL) a message is sent indicating the adjustment to, for example, a system administrator.

Figure 3:
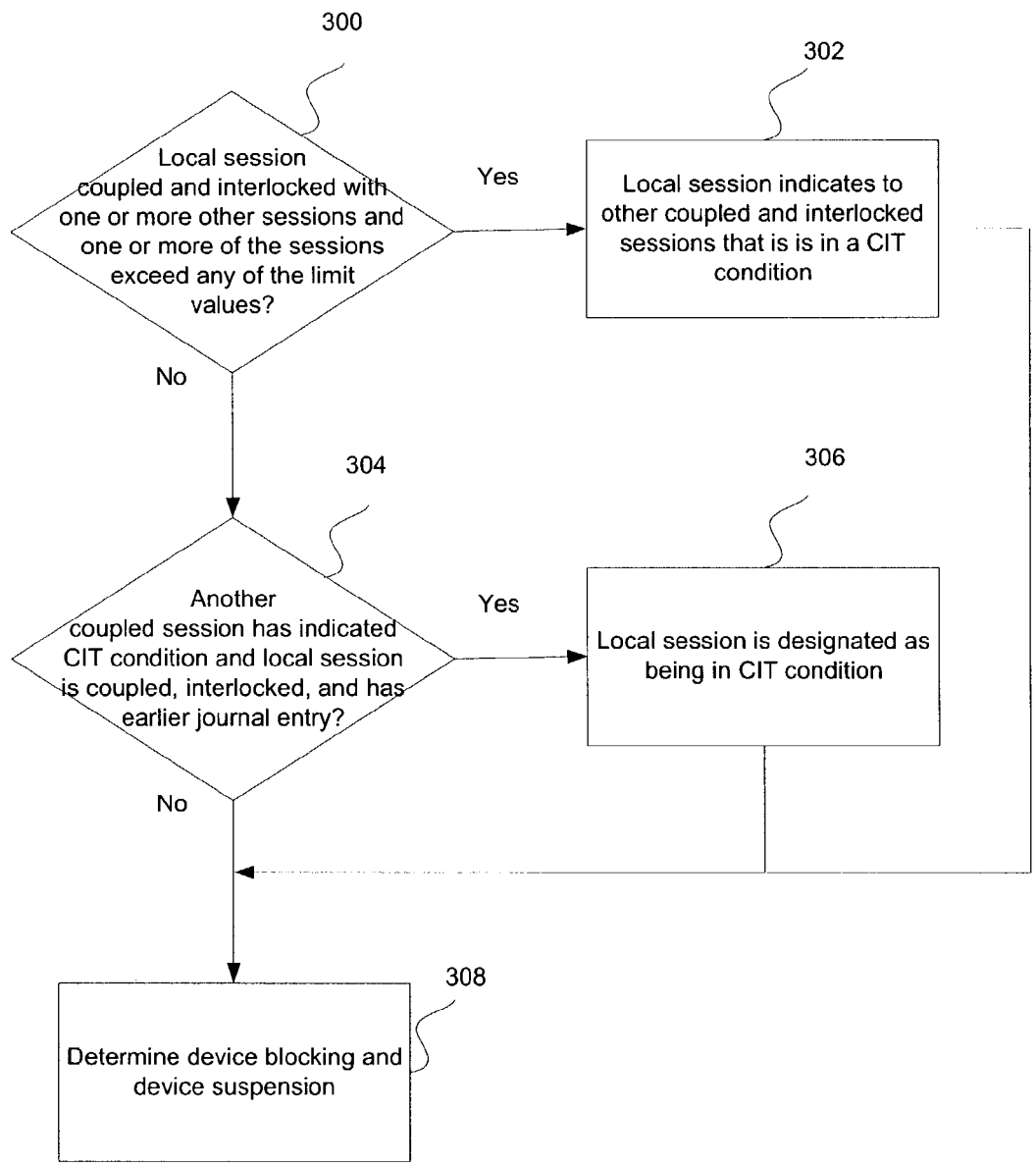
FIG. 3 illustrates logic for processing a cache-in-trouble (CIT) condition for a local session in accordance with certain implementations of the invention.

FIG. 3 illustrates logic for processing a CIT condition for a local session in accordance with certain implementations of the invention. Control begins at block 300 with the system data mover determinating whether the local session is coupled and interlocked with one or more other sessions and whether one or more of the sessions exceed any of the four limit values. Coupled sessions refer to sessions that communicate through a shared data set. Each of the coupled sessions periodically writes its status information to the shared data set and reads status information of other coupled sessions from the shared data set. Interlocked sessions are those that are consistent. That is, the interlocked sessions are in a window in which they are consistent. For example, if one session has a journal time entry (i.e., an time is associated with each entry in the journal queue) that is much earlier than journal time entries for the remaining coupled sessions, then the sessions are not likely to be interlocked. If so, processing continues to block 302, otherwise processing continues to block 304. In block 302, the local session indicates to the other coupled and interlocked sessions that it is in a CIT condition, and processing continues to block 308.

In block 304, the system data mover determines whether another coupled session has indicated that it is in a CIT condition, and the local session is coupled, interlocked, and has an earlier journal entry. If so, processing continues to block 306, otherwise, processing continues to block 308. A journal holds data written by each session, and the data is associated with a timestamp representing the time at which the data was written to the journal. In block 306, the local session is designated as being in a CIT condition. In particular, it is possible that one volume is undergoing a full volume restore, which requires large cache usage, which can impact cache usage by another volume. In this case, both volumes are in the CIT condition.

In block 308, the system data mover determines device blocking and device suspension for volumes associated with the session, which is described in further detail with reference to FIGS. 4A, 4B, and 4C below.

Figure 4A:
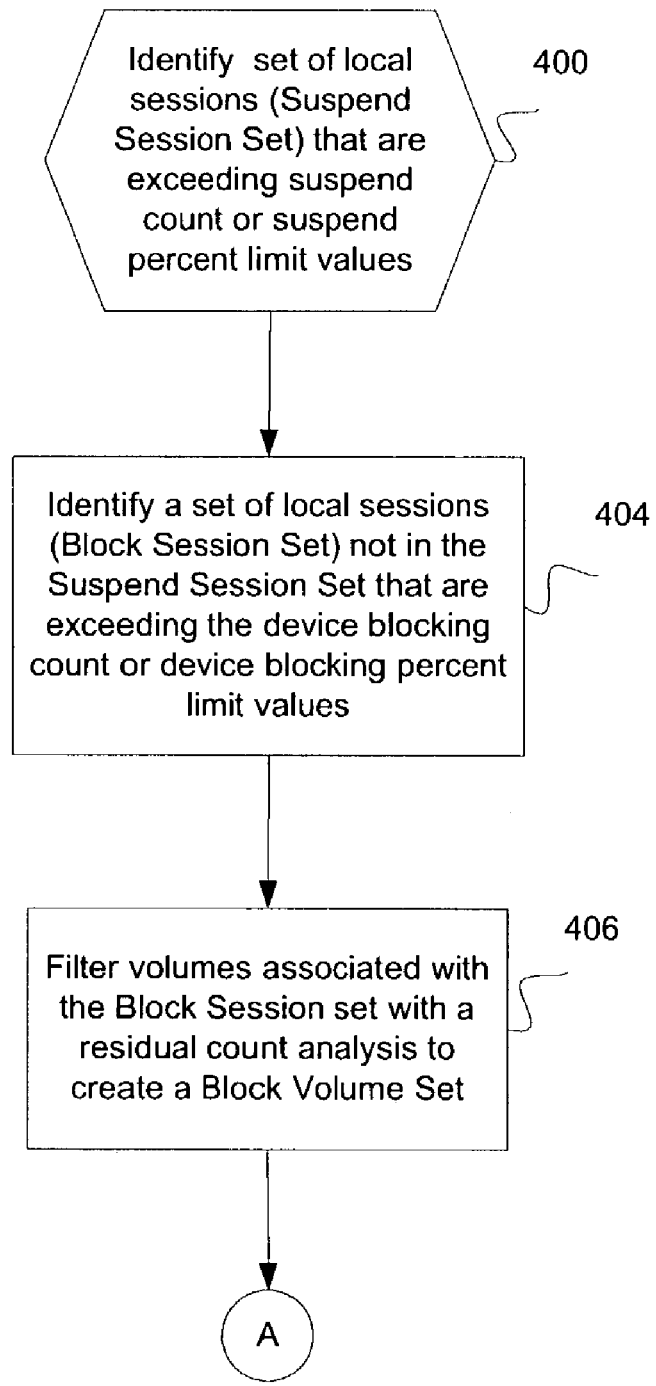
FIGS. 4A, 4B, and 4C illustrate logic for determining device blocking and device suspension for volumes associated with one or more sessions in accordance with certain implementations of the invention.
Figure 4B:
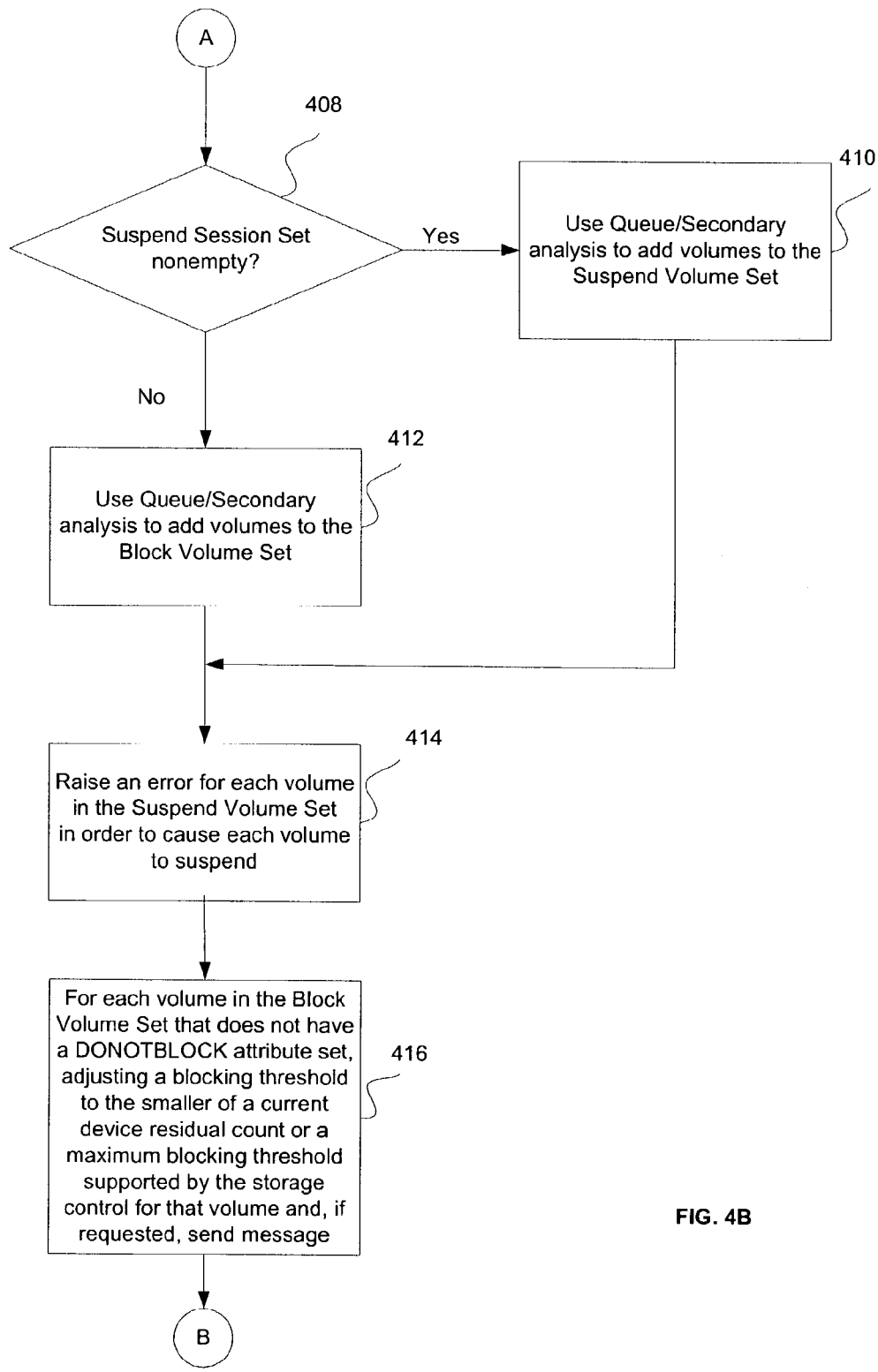
Figure 4C:
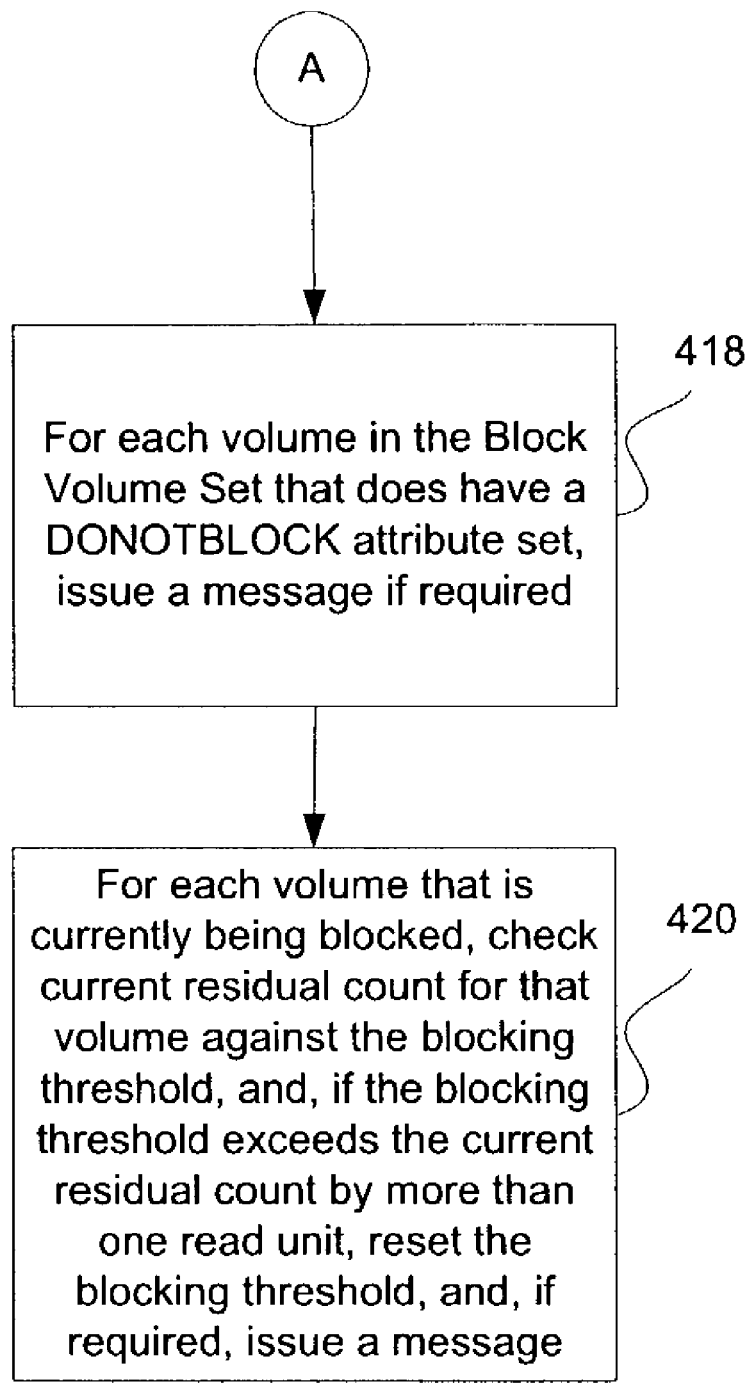

FIGS. 4A, 4B, and 4C illustrate logic for determining device blocking and device suspension for volumes associated with one or more sessions in accordance with certain implementations of the invention. In particular, when one or more local sessions are in CIT conditions, the data mover identifies two sets of volumes, suspend candidates and blocking adjustment candidates. Then, volumes in these sets are identified for suspension or device blocking.

Control begins at block 400 with the system data mover identifying a set of local sessions (also referred to as suspend session set) that are exceeding suspend count or suspend percent limit values. In block 404, the system data mover identifies a set of local sessions (also referred to block session set) that are not in the suspend session set and that are exceeding the device blocking count or device blocking percent limit values. In block 406, the system data mover filters volumes associated with the block session set with a residual count analysis to create a block volume set.

In block 408, the system data mover determines whether the suspend session set is nonempty. If so, processing continues to block 410, otherwise, processing continues to block 412. In block 410, a queue/secondary analysis (described in further detail with reference to FIG. 6 below) is used to add volumes to the suspend volume set and processing continues at block 414. In block 412, the queue/secondary analysis is used to add volumes to the block volume set. In block 414, the system data mover raises an error for each volume in the suspend volume set in order to cause the volume to suspend. Then error processing associated with an error level for that session controls the scope of the resulting volume suspension. For example, one volume of the session may be suspended or all volumes of the session may be suspended.

In block 416, for each volume in the block volume set that does not have a DONOTBLOCK attribute set, the system data mover adjusts a blocking threshold for that volume to a current device residual count or a maximum blocking threshold supported by the storage control for that volume, whichever is smaller. This prevents further growth of updates for the volume. Additionally, in block 416, if a device blocking indicator is set to indicate that a message is to be sent (e.g., DeviceBlockingMessage is set to YES or ALL), a message is sent indicating the adjustment to, for example, a system administrator.

In block 418, for each volume in the block volume set that does have a DONOTBLOCK attribute set, a message is sent, if required. In particular, if a device blocking message indicator is set to indicate that a message is to be sent (e.g., DeviceBlockingMessage is set to ALL), a message is sent to, for example, a system administrator indicating that this volume is causing delays for other volumes whose updates are to be transferred to the secondary control unit and that the volume causing the delays can not be device blocked. In block 420, for each volume that is currently being blocked, check the current residual count for that volume against the blocking threshold, and, if the blocking threshold exceeds the current residual count by more than one read unit, reset the blocking threshold. A read unit is defined as a maximum number of record sets that the system data mover is able to read in a single I/O operation. Additionally, in block 420, if a device blocking message indicator is set to indicate that a message is to be sent (e.g., DeviceBlockingMessage is set to YES or ALL), a message is sent indicating the adjustment to, for example, a system administrator.

Figure 5:
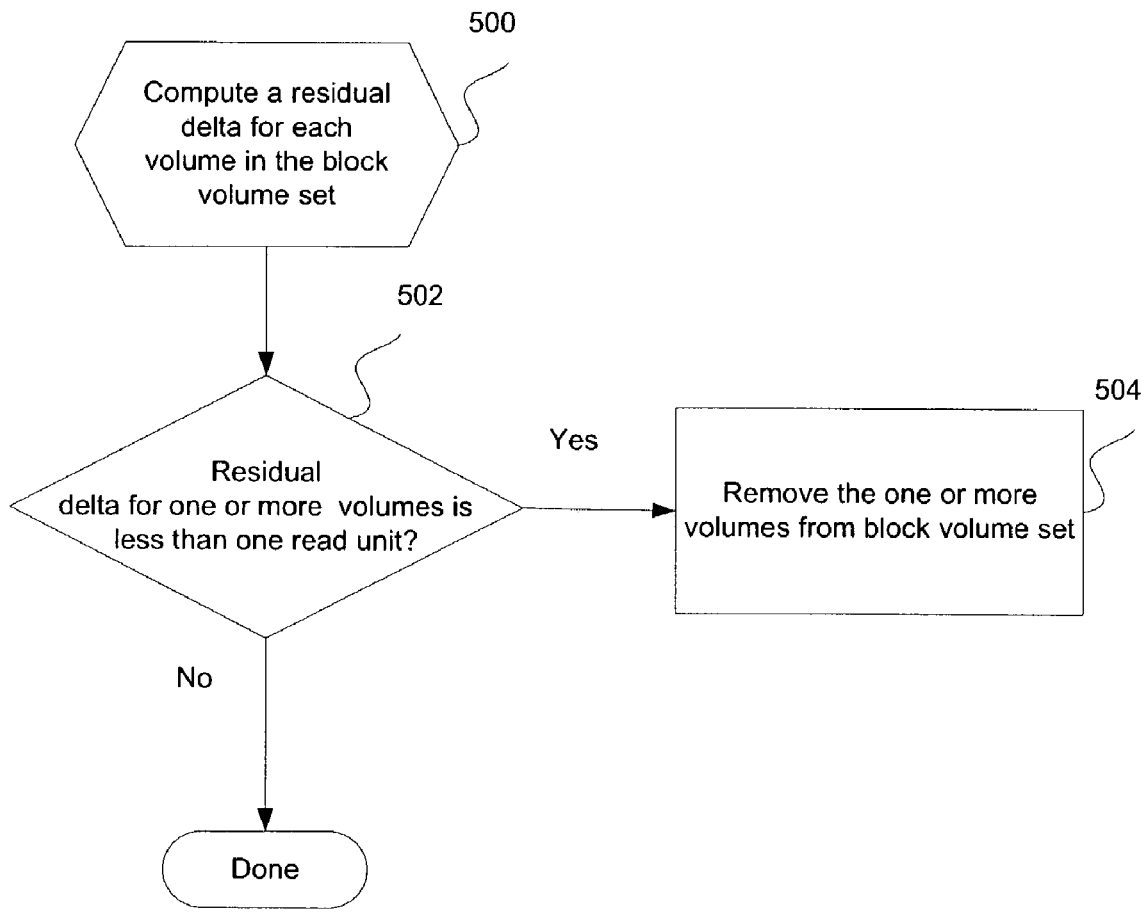
FIG. 5 illustrates logic for a residual count analysis in accordance with certain implementations of the invention.

FIG. 5 illustrates logic for a residual count analysis in accordance with certain implementations of the invention. Residual count analysis is used to remove volumes from the block volume set whose residual count has decreased more than what could have been read a nanosecond before. For example, if 100 blocks are read from cache for a volume, and an application writes an additional 100 blocks for that volume, which are then stored in cache, the blocking threshold for the volume is reached again, and the volume is not removed from the block volume set. Control begins at block 500 with the system data mover computing a residual delta for each volume in the block volume set. The term residual delta refers to the difference in residual counts for a volume between the prior and currently read residuals. In block 502, the system data mover determines whether the residual delta for one or more volumes is less than one read unit. If so, processing continues to block 504, otherwise, processing is done. In block 504, the one or more volumes whose residual delta is less than one read unit are removed from the block volume set.

Figure 6:
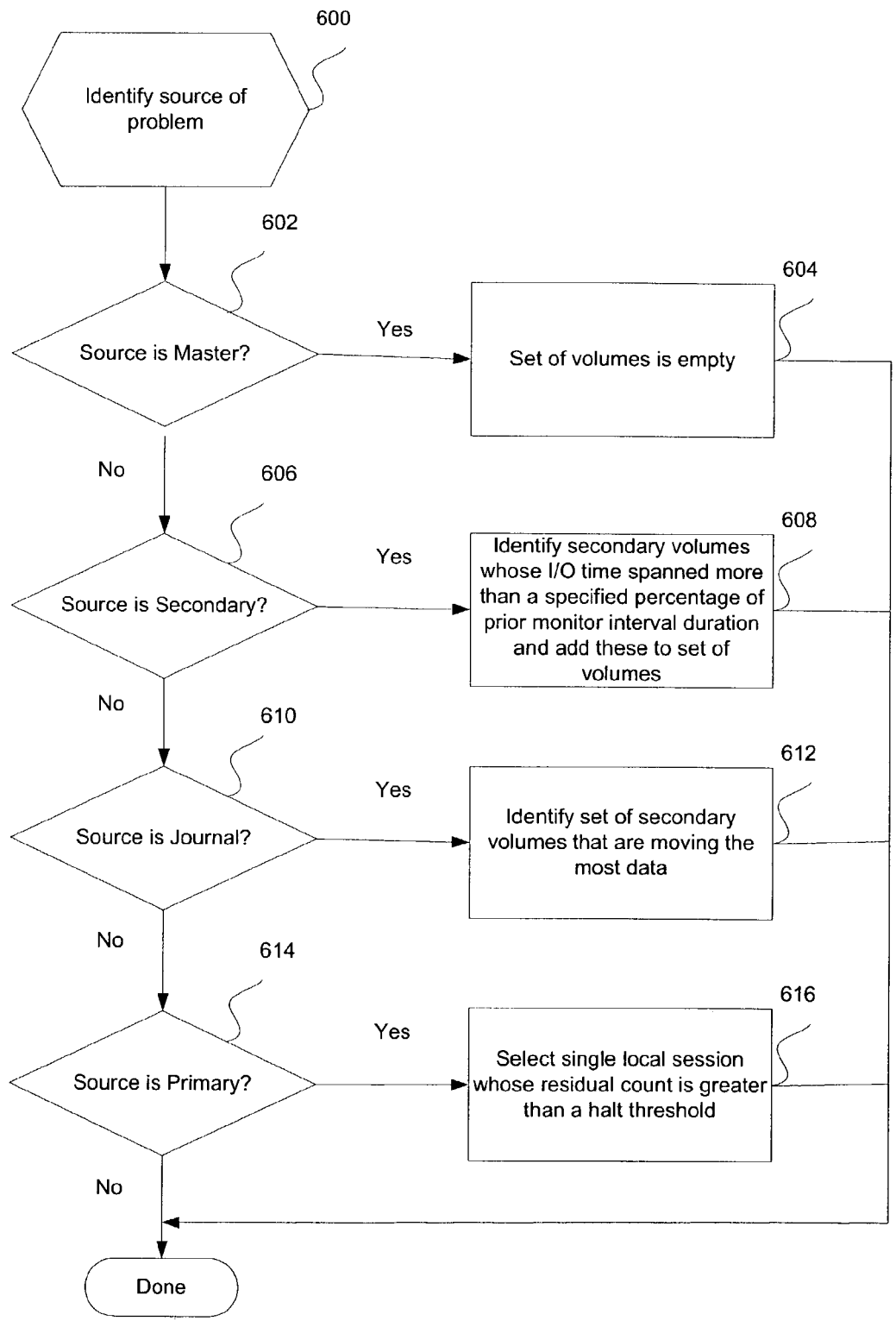
FIG. 6 illustrates logic for queue/secondary analysis in accordance with certain implementations of the invention.

FIG. 6 illustrates logic for queue/secondary analysis in accordance with certain implementations of the invention. Queue/secondary analysis is used to identify volumes that are contributing to cache growth, but that are not showing residual count growth. This may involve, for example, long-running jobs that are generating large blocksize updates. Control begins at block 600 with the system data mover identifying the source of a problem. The source refers to the location of a queue and is associated with a designation of master, secondary, journal, or primary, and different actions are associated with each of the designations.

In certain implementations of the invention, the system data mover checks for the source of trouble in a particular order. First, the system data mover examines a secondary queue, and, if the secondary queue is full, the source is designated as secondary. A secondary queue entry holds a single consistency group containing updates (i.e., data) for all the volumes in a local session. This data is about to be written to secondary volumes across many storage controls. This data has successfully been written to journal data sets.

Second, if the session is coupled and interlocked, the system data mover examines a gate queue, and, if there are more than five entries in the gate queue and there is at least one other interlocked session, the source is designated as master. A gate queue entry holds a single consistency group containing updates for all volumes in a focal session. For example, the IBM XRC system allows up to five IBM XRC local sessions to be coupled together. Each coupled and interlocked session indicates in the master data set that a consistency group entry is ready to be journaled. Once all coupled and interlocked sessions (i.e., up to five) have indicated that they have a consistency group ready to be journaled, the consistency groups can then be journaled. Hence, if more than five gate queue entries exist, this implies that the IBM XRC system may have problems that prevent these entries from being journaled. The gate queue is used to determine journals whose journal times are earlier than a minimum journal time for the interlocked sessions, and these determined journals are sent to a secondary control unit. If a particular session is running slow (i.e., has more than five entries in the gate queue), then the session is holding up other sessions, and that session should block a volume to avoid holding up the other sessions.

Third, the system data mover examines a journal queue, and if the journal queue has more than two entries, the source is designated as journal. A journal queue entry holds a single consistency group containing updates for all volumes in a local session. This data has not been written to a journal data set.

Fourth, the system data mover looks for a process performing many reads on a volume whose residual count is greater than a halt threshold (stored, for example, in the parameter library file), and, if found, the source is designated as primary. The halt threshold is used to stop volume synchronizations or resynchronizations (initialization) if the record set residual count of the storage control session associated with a volume reaches this threshold value. A low value reduces the impact of volume initialization activity that is running concurrently with heavy update activity. If this threshold is reached, volume initialization pauses until the residual count drops below the threshold. When the residual count drops below the halt threshold value, the volume synchronizations or resynchronizations begin again. In certain implementations of the invention, a user may specify a value between 0 and 9999 for the halt threshold.

In block 602, the system data mover determines whether the source is master. If so, processing continues to block 604, otherwise, processing continues to block 606. In block 604, the set of volumes are determined to be empty.

In block 606, the system data mover determines whether the source is secondary. If so, processing continues to block 608, otherwise, processing continues to block 610. In block 608, the system data mover identifies secondary volumes whose I/O time spanned more than a specified percentage of a prior monitor interval and adds these to the set of volumes. A monitor interval refers to a time period during which the volumes to be "unblocked" are identified. In particular, the secondary, journal, gate, and primary queues are checked periodically and currently blocked volumes are unblocked based on the check. In certain implementations of the invention, the percentage is 90 percent of a prior monitor interval and is stored in a tuning table and the monitor interval is 10 seconds. A tuning table is a global file in which tuning parameters are stored. For example, if the monitor interval is 10 seconds, and a secondary volume takes more than 9 seconds to write data, then the system data mover selects the secondary volume.

In block 610, the system data mover determines whether the source is journal. If so processing continues to block 612, otherwise, processing continues to block 614. In block 612, the system data mover identifies a set of secondary volumes that are moving the most data. In particular, the system data mover determines a maximum number of kilobytes written to any one secondary volume during the prior monitor interval. The system data mover then identifies the secondary volumes that wrote at least a specified percentage of this maximum value during the monitor interval and adds their associated primary volumes to the set of volumes. In certain implementations of the invention, the specified percentage is 80 percent of the maximum value and is stored in a tuning table.

In block 614, the system data mover determines whether the source is primary. If so, processing continues to block 616, otherwise, processing is done. In block 616, the system data mover selects a single local session whose residual count is greater than a halt threshold in the following order: a) the first session whose I/O time spanned more than a specified percentage of the prior monitor interval duration, and, in certain implementations of the invention, the specified percentage is 90 percent and is stored in the tuning table; if none exist, b) the session that most often had the earliest track information field time during the prior monitor interval; and, if none exist, c) the session with the highest residual count for all of its volumes. Once the session is selected, the system data mover determines the busies secondary volume associated with the session and adds its associated primary volume to the set of volumes. In this case, the busiest secondary volume is one to which the most kilobytes were written during the prior monitor interval.

In summary, certain implementations of the invention gather more information for a system data mover (e.g., an IBM XRC session) so as to autonomically adjust device blocking and device suspension of all primary volumes on primary storage devices across all primary control units. Along with this additional information, additional values are used to determine the different actions to be taken, which include both device blocking and device suspension (e.g., suspending the IBM XRC session activity for the storage device). These limit values are used to determine when a primary control unit may be approaching a cache usage situation that could possibly cause a long busy situation.

ESCON is a registered trademark or trademarks of International Business Machines Corporation in the United States and/or other countries.

Additional Implementation Details

The described techniques for improved device blocking and device suspension may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a, network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2, 3, 4A, 4B, 4C, 5, and 6 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2, 3, 4A, 4B, 4C, 5, and 6 may be implemented in software, hardware, programmable and non-programmable gate array logic or in some combination of hardware, software, or gate array logic.

Figure 7:
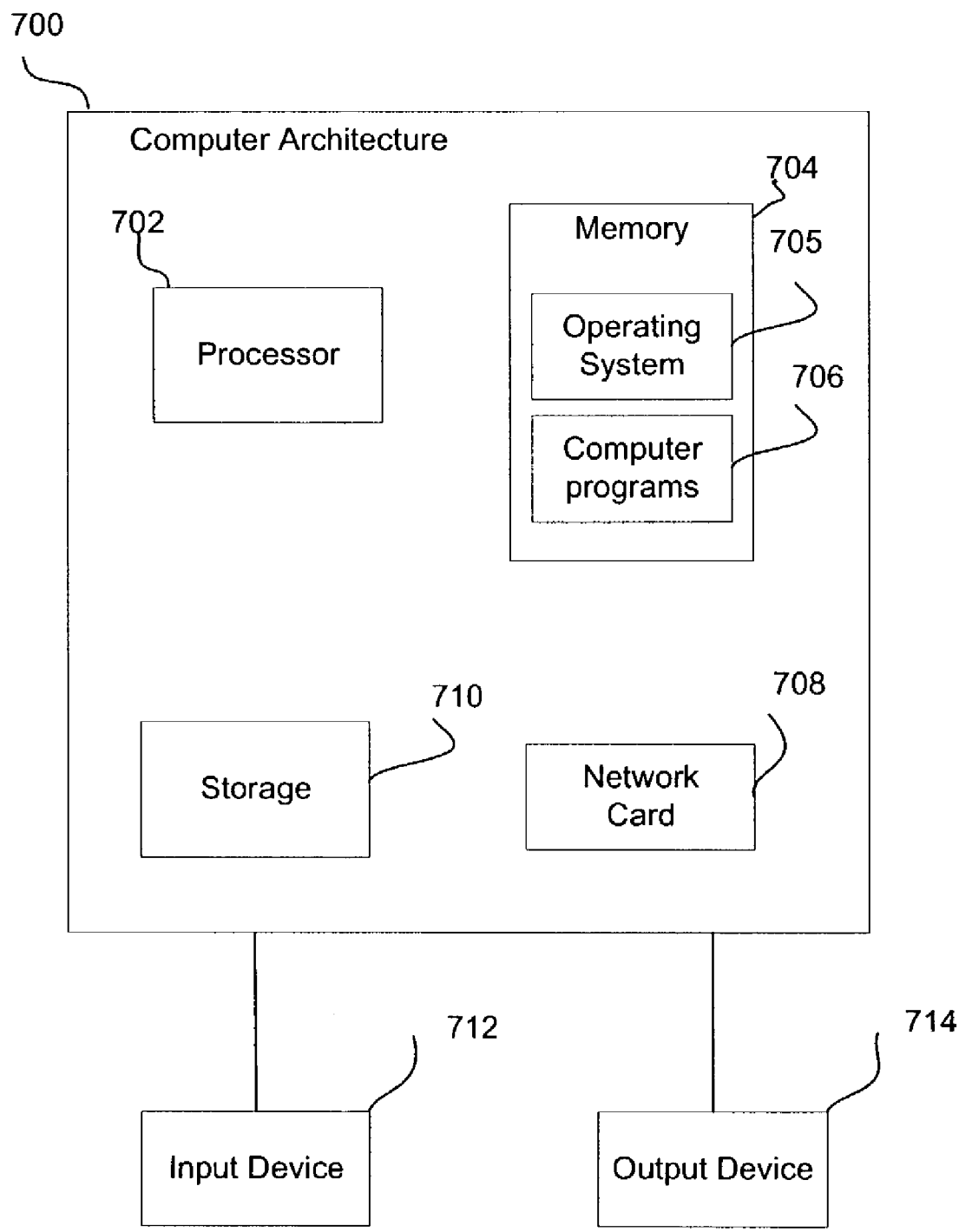
FIG. 7 illustrates a computer architecture of a computer system that may be used in accordance with certain implementations of the invention.

FIG. 7 illustrates a computer architecture 700 of a computer system that may be used in accordance with certain implementations of the invention. The computer architecture 700 of computer systems 110, 120, 130, 140, 160, and 160 may implement a processor 702 (e.g., a microprocessor), a memory 704 (e.g., a volatile memory device), and storage 710 (e.g., a non-volatile storage area, such as magnetic disk drives, optical disk drives, a tape drive, etc.). An operating system 705 may execute in memory 704. The storage 710 may comprise an internal storage device or an attached or network accessible storage. Computer programs 706 in storage 710 may be loaded into the memory 704 and executed by the processor 702 in a manner known in the art. The architecture further includes a network card 708 to enable communication with a network. An input device 712 is used to provide user input to the processor 702, and may include a keyboard, mouse, pen-stylus, microphone, touch sensitive display screen, or any other activation or input mechanism known in the art. An output device 714 is capable of rendering information transmitted from the processor 702, or other component, such as a display monitor, printer, storage, etc. The computer architecture 700 of the computer systems may include fewer components than illustrated, additional components not illustrated herein, or some combination of the components illustrated and additional components.

The computer architecture 700 may comprise any computing device known in the art, such as a mainframe, server, personal computer, workstation, laptop, handheld computer, telephony device, network appliance, virtualization device, storage control, etc. Any processor 702 and operating system 705 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. An article of manufacture including program logic for determining device suspension and device blocking, wherein the program logic causes operations to be performed, the operations comprising:

comparing local session cache usage and residual counts against limit values associated with that session, wherein the limit values comprise a device blocking count, a device blocking percent, a suspend count, and a suspend percent for the local session; and if a cache in trouble condition is detected based on the comparison, processing the cache in trouble condition to determine whether one or more volumes are to be blocked or suspended.

2. The article of manufacture of claim 1, wherein the operations for comparison are performed after a read operation has read data from cache.

3. The article of manufacture of claim 1, wherein the operations further comprise:

if the cache in trouble condition is not detected, resetting blocking thresholds for each volume associated with the local session that is currently being device blocked.

4. The article of manufacture of claim 1, wherein the operations further comprise:

determining that the local session is coupled and interlocked with one or more other sessions, wherein each session has associated limit values, and that one or more of the sessions exceeds at least one of the associated limit values for that session; and at the local session, indicating to the other sessions that the local session is in a cache in trouble condition.

5. The article of manufacture of claim 1, wherein the operations further comprise:

determining that a coupled session has indicated to the local session that the other coupled session is in a cache in trouble condition;

determining that the local session is coupled, interlocked, and has and earlier journal entry than the coupled session; and designating the local session as being in a cache in trouble condition.

6. The article of manufacture of claim 1, wherein the operations for processing the cache in trouble condition further comprise:

determining at least one of device blocking and device suspension for one or more volumes of the local session.

7. The article of manufacture of claim 6, wherein the operations for determining at least one of device blocking and device suspension further comprise:

identifying a set of sessions that are exceeding suspend count or suspend percent limit values to form a suspend session set;

filtering volumes associated with the suspend session set with a residual count analysis to form a suspend volume set;

identifying a set of sessions not in the suspend session set and that are exceeding the device blocking count or device blocking percent limit values to form a block session set; and filtering volumes associated with the block session set with the residual count analysis to form a block volume set.

8. The article of manufacture of claim 7, wherein the operations further comprise:

if the suspend session set is nonempty, using a queue/secondary analysis to add volumes to the suspend volume set; and if the suspend session set is empty, using the queue/secondary analysis to add volumes to the block volume set.

9. The article of manufacture of claim 8, wherein the operations further comprise:

for each volume in the suspend volume set, raising an error.

10. The article of manufacture of claim 8, wherein the operations further comprise:

for each volume in the block volume set that does not have a DONOTBLOCK attribute set, adjusting a blocking threshold to a smaller of a current device residual count and a maximum blocking threshold.

11. The article of manufacture of claim 8, wherein the operations further comprise:

for each volume in the block volume set that does have a DONOTBLOCK attribute set, issuing a message.

12. The article of manufacture of claim 8, wherein the operations further comprise:

for each volume that is currently being blocked,
checking a current residual count for that volume against a blocking threshold; and
if the blocking threshold exceeds the current residual count by more than one read unit, resetting the blocking threshold.

13. The article of manufacture of claim 8, wherein the operations for using the queue/secondary analysis further comprise:

identifying a source; and
determining actions to perform based on the identified source.

14. The article of manufacture of claim 7, wherein the operations for using the residual count analysis further comprise:

computing a residual delta for volumes associated with the block session set;
if the residual delta for one or more volumes is less than one read unit, removing the volumes from the set.

15. A system for determining device suspension and device blocking, comprising:

a processor;
a computer readable medium accessible to the processor; and
program logic including code capable of causing the processor to perform:
(i) comparing local session cache usage and residual counts against limit values associated with that session, wherein the limit values comprise a device blocking count, a device blocking percent, a suspend count, and a suspend percent for the local session; and
(ii) if a cache in trouble condition is detected based on the comparison, processing the cache in trouble condition to determine whether one or more volumes are to be blocked or suspended.

16. The system of claim 15, wherein the code is capable of causing the processor to perform the comparison after a read has read data from cache.

17. The system of claim 15, wherein the code is capable of causing the processor to further perform:
   if the cache in trouble condition is not detected, resetting blocking thresholds for each volume associated with the local session that is currently being device blocked.

18. The system of claim 15, wherein the code is capable of causing the processor to further perform:
   determining that the local session is coupled and interlocked with one or more other sessions, wherein each session has associated limit values, and that one or more of the sessions exceeds at least one of the associated limit values for that session; and
   at the local session, indicating to the other sessions that the local session is in a cache in trouble condition.

19. The system of claim 15, wherein the code is capable of causing the processor to further perform:
   determining that a coupled session has indicated to the local session that the other coupled session is in a cache in trouble condition;
   determining that the local session is coupled, interlocked, and has an earlier journal entry than the coupled session; and
   designating the local session as being in a cache in trouble condition.

20. The system of claim 15, wherein the code for processing the cache in trouble condition is capable of causing the processor to further perform:
   determining at least one of device blocking and device suspension for one or more volumes of the local session.

21. The system of claim 20, wherein the code for determining at least one of device blocking and device suspension is capable of causing the processor to further perform:
   identifying a set of sessions that are exceeding suspend count or suspend percent limit values to form a suspend session set;
   filtering volumes associated with the suspend session set with a residual count analysis to form a suspend volume set;
   identifying a set of sessions not in the suspend session set and that are exceeding the device blocking count or device blocking percent limit values to form a block session set; and
   filtering volumes associated with the block session set with the residual count analysis to form a block volume set.

22. The system of claim 21, wherein the code is capable of causing the processor to further perform:
   if the suspend session set is nonempty, using a queue/secondary analysis to add volumes to the suspend volume set; and
   if the suspend session set is empty, using the queue/secondary analysis to add volumes to the block volume set.

23. The system of claim 22, wherein the code is capable of causing the processor to further perform:
   for each volume in the suspend volume set, raising an error.

24. The system of claim 22, wherein the code is capable of causing the processor to further perform:
   for each volume in the block volume set that does not have a DONOTBLOCK attribute set, adjusting a blocking threshold to a smaller of a current device residual count and a maximum blocking threshold.

25. The system of claim 22, wherein the code is capable of causing the processor to further perform:
   for each volume in the block volume set that does have a DONOTBLOCK attribute set, issuing a message.

26. The system of claim 22, wherein the code is capable of causing the processor to further perform:
   for each volume that is currently being blocked,
      checking a current residual count for that volume against a blocking threshold; and
      if the blocking threshold exceeds the current residual count by more than one read unit, resetting the blocking threshold.

27. The system of claim 22, wherein the code for using the queue/secondary analysis is capable of causing the processor to further perform:
   identifying a source; and
   determining actions to perform based on the identified source.

28. The system of claim 21, wherein the code for using the residual count analysis is capable of causing the processor to further perform:
   computing a residual delta for volumes associated with the block session set;
   if the residual delta for one or more volumes is less than one read unit, removing the volumes from the set.

29. A method for determining device suspension and device blocking, comprising:
   comparing local session cache usage and residual counts against limit values associated with that session, wherein the limit values comprise a device blocking count, a device blocking percent, a suspend count, and a suspend percent for the local session; and
   if a cache in trouble condition is detected based on the comparison, processing the cache in trouble condition to determine whether one or more volumes are to be blocked or suspended.

30. An article of manufacture including program logic for determining device suspension and device blocking, wherein the program logic causes operations to be performed, the operations comprising:
   comparing at least one of local session cache usage and residual counts against limit values associated with that session, wherein the limit values comprise at least two of a device blocking count, a device blocking percent, a suspend count, and a suspend percent for the local session; and
   if a cache in trouble condition is detected based on the comparison, processing the cache in trouble condition to determine whether one or more volumes are to be blocked or suspended.

31. An article of manufacture including program logic for determining device blocking, wherein the program logic causes operations to be performed, the operations comprising:
   comparing local session cache usage and residual counts against limit values associated with that session, wherein the limit values comprise a device blocking count and a device blocking percent for the local session; and
   if a cache in trouble condition is detected based on the comparison, processing the cache in trouble condition to determine whether one or more volumes are to be blocked.

32. An article of manufacture including program logic for determining device suspension, wherein the program logic causes operations to be performed, the operations comprising:

comparing a local session cache usage and residual counts against limit values associated with that session, wherein the limit values comprise a suspend count and a suspend percent for the local session; and if a cache in trouble condition is detected based on the comparison, processing the cache in trouble condition to determine whether one or more volumes are to be suspended.

33. An article of manufacture including program logic for determining at least one of device suspension and device blocking, wherein the program logic causes operations to be performed, the operations comprising:

comparing at least one of a local session cache usage and residual counts against limit values associated with that session, wherein the limit values comprise at least one of a device blocking percent, a suspend count, and a suspend percent for the local session; and if a cache in trouble condition is detected based on the comparison, processing the cache in trouble condition to determine whether one or more volumes are to be blocked or suspended.

* * * * *

UNITED STATES PATENT AND TRADEMARK OFFICE
CERTIFICATE OF CORRECTION

PATENT NO. : 7,003,706 B2  Page 1 of 1
APPLICATION NO. : 10/445688
DATED : February 21, 2006
INVENTOR(S) : Gregory Edward McBride et al.

It is certified that error appears in the above-identified patent and that said Letters Patent is hereby corrected as shown below:

Column 15, line 49 and Column 17, line 24, delete "have and" and insert -- have an --.

Signed and Sealed this

Sixteenth Day of October, 2007

JON W. DUDAS
*Director of the United States Patent and Trademark Office*